US008290106B2

(12) United States Patent
Kuppens

(10) Patent No.: US 8,290,106 B2
(45) Date of Patent: Oct. 16, 2012

(54) SYSTEM AND METHOD FOR GENERATING LINEAR TIME CODE DATA

(75) Inventor: Chris Kuppens, Oosterhout (NL)

(73) Assignee: GVBB Holdings S.A.R.L., Luxembourg (LU)

( * ) Notice: Subject to any disclaimer, the term of this patent is extended or adjusted under 35 U.S.C. 154(b) by 1035 days.

(21) Appl. No.: 12/231,728

(22) Filed: Sep. 5, 2008

(65) Prior Publication Data

US 2009/0067561 A1     Mar. 12, 2009

(30) Foreign Application Priority Data

Sep. 7, 2007   (EP) ..................................... 07301349

(51) Int. Cl.
*H04L 7/00* (2006.01)
(52) U.S. Cl. .................................. 375/362; 375/E7.001
(58) Field of Classification Search ............. 375/240.01, 375/362
See application file for complete search history.

(56) References Cited

U.S. PATENT DOCUMENTS

| 6,134,379 A * | 10/2000 | LaMacchia ................... 386/201 |
| 2006/0291545 A1 * | 12/2006 | Lau et al. ....................... 375/220 |

FOREIGN PATENT DOCUMENTS

| EP | 1445944 | 11/2004 |
| JP | 11190303 A | 7/1999 |
| JP | 2004351480 A | 12/2004 |

OTHER PUBLICATIONS

Begueret, Jean-Baptiste, Yann Deval, Oliver Mazouffre, Anne Spataro, Pascal Fouillat, Eric Benoit, and Jean Mendoza. 2001. Clock Generator using factorial DLL for Video Applications. IEEE 2001 Custom Integrated Circuits Conference.*
Integrated Circuit Systems, Inc., SMPTE Time Code Receiver/Generator. Apr. 5, 2005, 1-24, ICS2008B.
Alpermann+Velte, Rubidium Series: Time Code with 48, 50 and 60 frame rates. Feb. 21, 2007, XP-0024676885.
SMPTE Standard, for Television, Audio and Film—Time and Control Code, Sep. 1, 1999, 1-21, XP-002457686.
European Search Report dated Feb. 15, 2008.
Office Action in Japanese Patent Application No. 2008-227351 issued Aug. 7, 2012.
Abstract of JP 11-190303 published Jul. 13, 1999.
Abstract of JP 2004-351480 published Dec. 16, 2004.

* cited by examiner

*Primary Examiner* — Taghi Arani
*Assistant Examiner* — Narciso Victoria
(74) *Attorney, Agent, or Firm* — Arent Fox LLP

(57) ABSTRACT

The present invention relates to a linear time code (LTC) generator that is adapted to generate LTC data. The LTC generator comprises a rising edge detector that is adapted to detect a frame sync input corresponding to a beginning of a frame time of video data and to generate a first synchronization signal corresponding to the frame sync input and a frame length measurement block that is adapted to count a number of clock cycles in the frame time. The LTC generator further comprises a bit rate calculator that is adapted to determine a bit rate of the frame time based on the number of clock cycles in the frame time and a bit rate counter block that is adapted to generate a second synchronization signal corresponding to the bit rate. Finally, the LTC generator comprises an output device that is adapted to insert a first data bit of the LTC data into a digital bit stream according to the first synchronization signal and to insert subsequent data bits of the LTC data into the digital bit stream according to the second synchronization signal.

8 Claims, 2 Drawing Sheets

SYSTEM AND METHOD FOR GENERATING LINEAR TIME CODE DATA

This application claims the benefit, under 35 U.S.C. §119 of European Patent Application No. 07301349.2, filed Sep. 7, 2007.

FIELD OF THE INVENTION

The present invention relates to the generation of linear time code data in a digital video camera system.

BACKGROUND OF THE INVENTION

As digital video cameras are increasingly used in the film industry, a reliable system and method for incorporating time code data into a digital video camera becomes increasingly desirable. Linear Time Code (LTC) data (also called longitudinal time code data) is commonly used in the film industry and is also suitable for digital video systems as a synchronization/time code data source.

U.S. Pat. No. 5,857,044 to Ogawa, et al. discloses a method and apparatus for processing time code. Specifically, the method described by Ogawa, et al. is a method for processing a time code such that time code data composed of an hour minute second frame accompanies picture information of a predetermined system. The time code data is mapped onto picture information of another system, when converting the picture information of the predetermined system into that of another system. The time code is mapped when converting the system of the picture information including the steps of converting time code data accompanying picture information of a predetermined system into a total frame number x, calculating a total frame number y of the converted time code data for the time code data from the total frame number x and generating the converted time code from the total frame number y.

The publication "SMPTE Time Code Receiver/Generator", Integrated Circuit Systems, Inc., Publication No. ICS2008B, Rev. D, April 2005, discloses a time code receiver/generator. The SMPTE time code receiver/generator is a VLSI device that provides the timing coordination for Multimedia sight and sound events. Although it is aimed at a PC Multimedia environment, it is capable of being integrated into products requiring SMPTE time code generation and/or reception in LTC (Longitudinal Time Code) and/or VITC (Vertical Interval Time Code) formats and MTC (MIDI Time Code) translation.

The publication "FPGA-Based LTC Receiver and Transmitter Functional Specification", John Ciardi, May 8, 2003, discloses an SMPTE 12M compatible LTC receiver and transmitter that can be implemented in an FPGA. The clock rate for both devices is 27 MHz, making them suitable for integration into a video-centric product. The transmitter symbol data rate is fixed at 80× the corresponding video frame rate. The LTC biphase-mark encoded output stream can be phase synchronized to an external vertical sync pulse or can free run relative to the vertical phase of the corresponding video. The bit rate of the LTC receiver can be asynchronous to the 27 MHz clock. No PLL circuitry is required. The LTC receiver works on the principal of a UART (universal asynchronous receiver-transmitter) for decoding frame-based data. That is, logic operating at a clock rate much higher than the symbol rate simultaneously detects the synchronization pattern and the symbol interval of the synchronization bits. This information is used to decode the actual data bits for that particular frame. The logic adapts to a changing symbol rate on a frame-by-frame basis.

The publication "Longitudinal Time Code Generator (LTC Generator), Product Specification", Deltatec, February 2004, discloses an LTC generator. The LTC generator core accepts 80 bits of SMPTE/EBU audio Longitudinal Time Code from its 16 bits wide µP interface. The LTC generator synchronizes on the falling edge of the incoming reference signal to start transmission of the received time code. The 80 bits long time code is serialized, biphase mark encoded and transmitted over the full video frame. A simple external analog audio interface is necessary to properly shape (gain & slope adjustment) the digital LTC bitstream.

The publication "Time and Control Code, SMPTE Standard for Television", Society of Motion Picture and Television Engineers, April 2007, discloses a digital time and control code for use in television, film, and accompanying audio systems operating at nominal rates of 60, 59.94, 50, 30, 29.97, 25, 24, and 23.98 frames per second. The publication defines a time address, binary groups, and flag bit structure. The publication also defines a binary group flag assignment, a linear time code transport, and a vertical interval time code transport. Further, the publication defines two primary data structures, LTC and Vertical Interval Time Code (VITC). The publication defines the VITC modulation and location for 525/59.94 and 625/50 analog systems only.

U.S. Pat. No. 6,044,197 to Smith, et al. discloses a method of recording time code in a database which makes it easy to search for video segments on a target medium while making the original source time code available on playback. As a video segment from a source medium is recorded on the target medium the time code from the first frame of the video segment is extracted and held. The number of frames of the video segment are counted to determine a duration, and at the conclusion of the video segment the extracted time code together with the duration and a location code indicating where on the target medium the video segment is stored are formed into a data structure that is stored in a break table in the database as a "break" entry. The break table is sorted, optimized to eliminate any break entry overlaps, and updated after each new break entry.

U.S. Patent Publication No. 20060087458 to Rodigast, et al. discloses a device for synchronizing an audio signal with a film comprising frames, wherein each frame comprises an imprinted time code. The device includes means for detecting the imprinted time code for the sequence of frames in order to obtain a detected sequence of time codes. Further, a time code generator is provided which is implemented to generate a sequence of synthesis time codes based on an initial value. A decoder is further provided to decode a time code of the detected sequence of time codes in order to provide the initial value for the time code generator. A detected time code and a corresponding synthesis time code are compared in order to then, when a phase deviation is found to be above a deviation threshold value, manipulate the synthesis time code for this frame in so far that it is changed with regard to its temporal length. This synthesis time code is then provided to an audio processing means which is implemented to provide the samples of the audio signal associated with this frame in a time-controlled way in response to a detection of the synthesis time code for a frame. Thus, a flexible system is obtained, by which any number of audio players may be synchronized with the film, particularly as the audio players are provided with predefined synthesis time codes or manipulated synthesis time codes for synchronization purposes.

U.S. Patent Publication No. 20060227879 to Ciardi discloses an LTC receiver for receiving and decoding a LTC frame of the type used in connection with film and television and accompanying audio. The receiver includes a first counter that measures the number of reference clock periods within the duration of a bi-phase mark signal interval to yield a timing reference for extracting the payload from the LTC frame. A second counter detects a sync field within the LTC frame to establish the LTC frame direction. A third counter serves to count the number of symbols in the LTC frame. A state machine responsive to the counts of the first, second and third counters, serves to (a) detect a valid synchronization sequence within an incoming LTC frame; (b) determine the LTC frame direction, (c) decode (extract) payload information from the LTC frame; and (d) transfer the payload information in an order determined by the LTC frame direction.

U.S. Patent Publication No. 20050162546 to Hosoda et al. discloses a system in which, when a time code signal corresponding to an image signal, to which a format conversion changing the number of frames per second is executed, is transmitted, information indicating a frame position where image data is changed through the format conversion in the image signal is attached to the time code signal to be transmitted. Alternatively, information indicating a synchronous state between frame conversion cycles in the format conversion and time code progression is attached to the time code signal. In the fore going manner, a relationship between the frame position and the time code can be accurately grasped. Further, a secondary conversion (inverse conversion) is accurately executed to the image signal by means of the time code signal.

U.S. Patent Publication No. 20010001023 to Imahashi, et al. discloses a method and apparatus for generating an encoded data stream representing a number of pictures or frames and having a number of layers including a picture layer in which time code information attached to the original data is described or inserted therein for each picture. Such time code information may be inserted into a user data area of the picture layer of the encoded data stream.

U.S. Pat. No. 6,222,980 to Asai et al. discloses a direction detector that operates for detecting a direction of feed of a recording tape. A timer operates for counting pulses of a clock signal, and outputting a signal representing a first count value. A second count value is generated which corresponds to a pulse width related to a first bit represented by an input time code signal reproduced from the recording tape. The first count value which occurs at a first time point and the second count value are added into a first addition-result value. An output time code signal is inverted when the first count value currently represented by the output signal of the timer comes equal to the first addition-result value. A second bit is selected from among bits represented by the input time code signal in response to the direction detected by the direction detector. The second bit to be selected neighbors the first bit in a normal time direction when the detected direction agrees with a forward direction. The second bit to be selected neighbors the first bit in a reverse time direction when the detected direction agrees with a reverse direction. A third count value is generated which corresponds to a pulse width related to the second bit. The first count value which occurs at a second time point after the first time point and the third count value are added into a second addition-result value. The first addition-result value is updated into the second addition-result value.

SUMMARY OF THE INVENTION

It is an object of the present invention to provide an LTC generator with automatic bit distribution of the outputted linear time code data.

An LTC generator that is adapted to generate LTC data in accordance with the present invention is recited in claim 1. The LTC generator comprises a rising edge detector that is adapted to detect a frame sync input corresponding to a beginning of a frame time of video data and to generate a first synchronization signal corresponding to the frame sync input. The LTC generator also comprises a frame length measurement block that is adapted to count a number of clock cycles in the frame time and a bit rate calculator that is adapted to determine a bit rate of the frame time based on the number of clock cycles in the frame time. A bit rate counter block that is adapted to generate a second synchronization signal corresponding to the bit rate is also included in the LTC generator, as is an output device (310) that is adapted to insert a first data bit of the LTC data into a digital bit stream according to the first synchronization signal and to insert subsequent data bits of the LTC data into the digital bit stream according to the second synchronization signal.

The output device may be adapted to insert the LTC data across a single frame time if the frame of video data comprises standard definition video data. In addition, the output device may be adapted to insert the LTC data across two frame times if the frame of video data comprises high definition video data. In a preferred embodiment of the invention, the output device is adapted to store the LTC data in association with a corresponding frame of video data.

A method of applying LTC data to a digital bit stream in accordance with the present invention is set forth in claim 6. The method comprises counting a number of clock cycles in a frame time of video data and determining a bit rate of the frame time based on the number of clock cycles in the frame time. The method additionally comprises inserting a first data bit of the linear time code data into the digital bit stream according to a first synchronization signal that corresponds to a start of the frame time, and inserting subsequent data bits of the linear time code data into the digital bit stream according to a second synchronization signal that corresponds to the bit rate.

The method of applying LTC data to the digital bit stream may additionally comprise inserting the LTC data across a single frame time if the frame of video data comprises standard definition video data. Further, the method may comprise inserting the LTC data across two frame times if the frame of video data comprises high definition video data.

The method of applying LTC data preferably comprises storing the LTC data in association with a corresponding frame of video data.

A preferred embodiment of the present invention is described with reference to the accompanied drawings. The preferred embodiment merely exemplifies the invention. Plural possible modifications are apparent to the skilled person. The gist and scope of the present invention is defined in the appended claims of the present application.

DETAILED DESCRIPTION OF PREFERRED EMBODIMENTS

Figure 1:
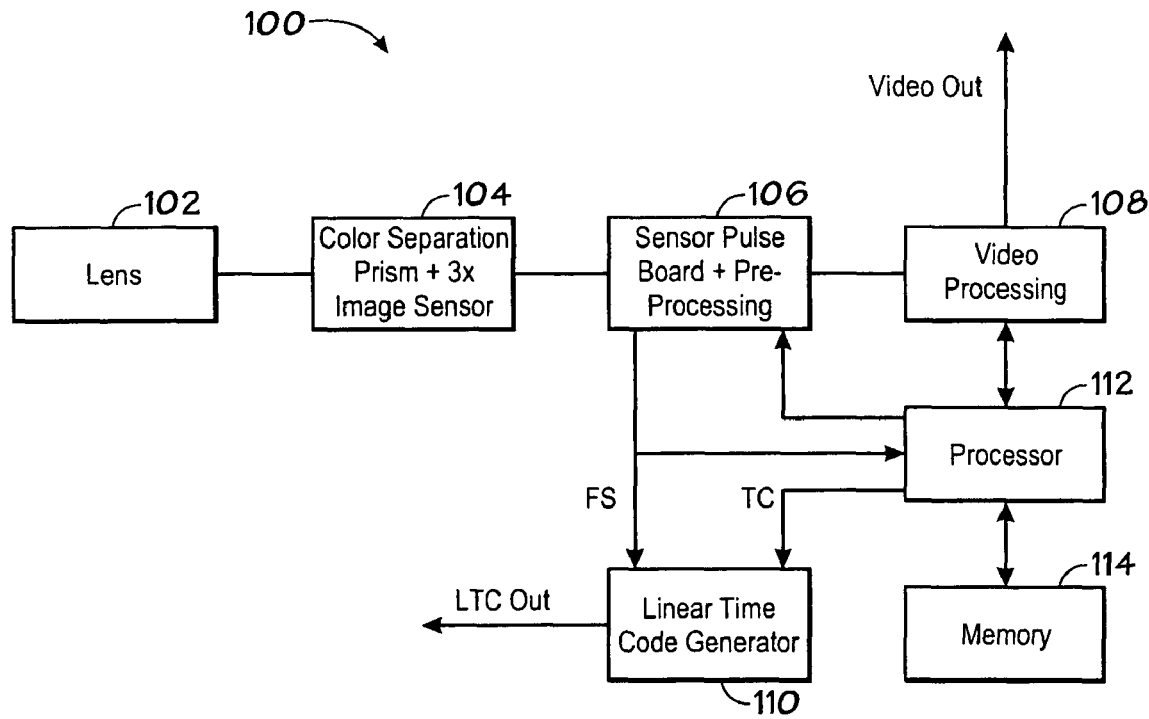
FIG. 1 is a block diagram of a digital video camera system in accordance with an exemplary embodiment of the present invention.

FIG. 1 shows an exemplary digital video-camera system 100 in accordance with an exemplary embodiment of the present invention. The skilled person will appreciate that the functional blocks shown in FIG. 1 may comprise hardware elements (including circuitry), software elements (including computer code stored on a machine-readable medium) or a combination of both hardware and software elements.

The camera system 100 comprises a lens 102. An image sensor block 104 comprises a 3x image sensor, which has separate sensors for capturing red, green and blue images through the lens 102. The image sensor block 104 may be glued to a colour separation prism. The image sensors deliver signals that correspond to the captured image to a sensor pulse board and pre-processing block 106. The pre-processing block 106 conditions the signal by, for example, removal of unwanted signals, amplitude and black level correction or the like before delivering the signal for further processing to a video processing block 108. The sensor pulse block 106 drives the analogue image sensors of the image sensor block 104 with appropriate pulses with respect to timing and voltage. The sensor pulse block 106 also produces a frame synchronization signal (FS) to an LTC generator 110 and a processor 112. The frame sync signal is generated at the beginning of each frame of video image data. Under control of the processor 112, the video processing block 108 produces a video output signal corresponding to a series of images captured by the image sensor block 104.

The skilled person will appreciate that the processor 112 controls the overall operation of the camera system 100. A memory 114 is operably coupled to the processor 112. The skilled person will appreciate that the memory 114 is illustrated as a single block in FIG. 1 for purposes of simplicity. In fact, the memory 114 may comprise volatile memory portions and non-volatile memory portions that each performs different functions. For example, a volatile memory portion of the memory 114 may store computer-readable instructions that cause the processor 112 to control the overall operation of the camera system 100. In addition, a non-volatile memory portion of the memory 114 may store video images recorded by the camera system 100.

As described in detail below, the LTC generator 110 generates LTC data in association with images captured by the camera system 100. The LTC data includes time code data provided by the processor 112. Preferably, the camera system 100 stores LTC data generated by the LTC generator 110 in a memory such as the memory 114 in association with recorded image data.

Figure 2:
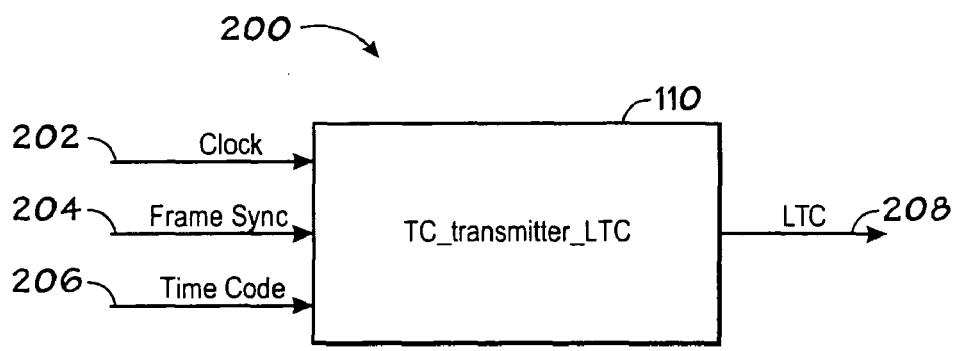
FIG. 2 is a block diagram of a linear time code generator in accordance with an exemplary embodiment of the present invention. The linear time code generator shown in FIG. 2 comprises a component of the digital video camera system shown in FIG. 1.

FIG. 2 is a block diagram of the LTC generator 110 in accordance with an exemplary embodiment of the present invention. The LTC generator 110 receives a clock input 202, a frame sync (FS from FIG. 1) input 204 and a time code input 206 (TC from FIG. 1). Based on these inputs, the LTC generator 110 produces an LTC data output 208, which is stored in association with video data as it is recorded.

Figure 3:
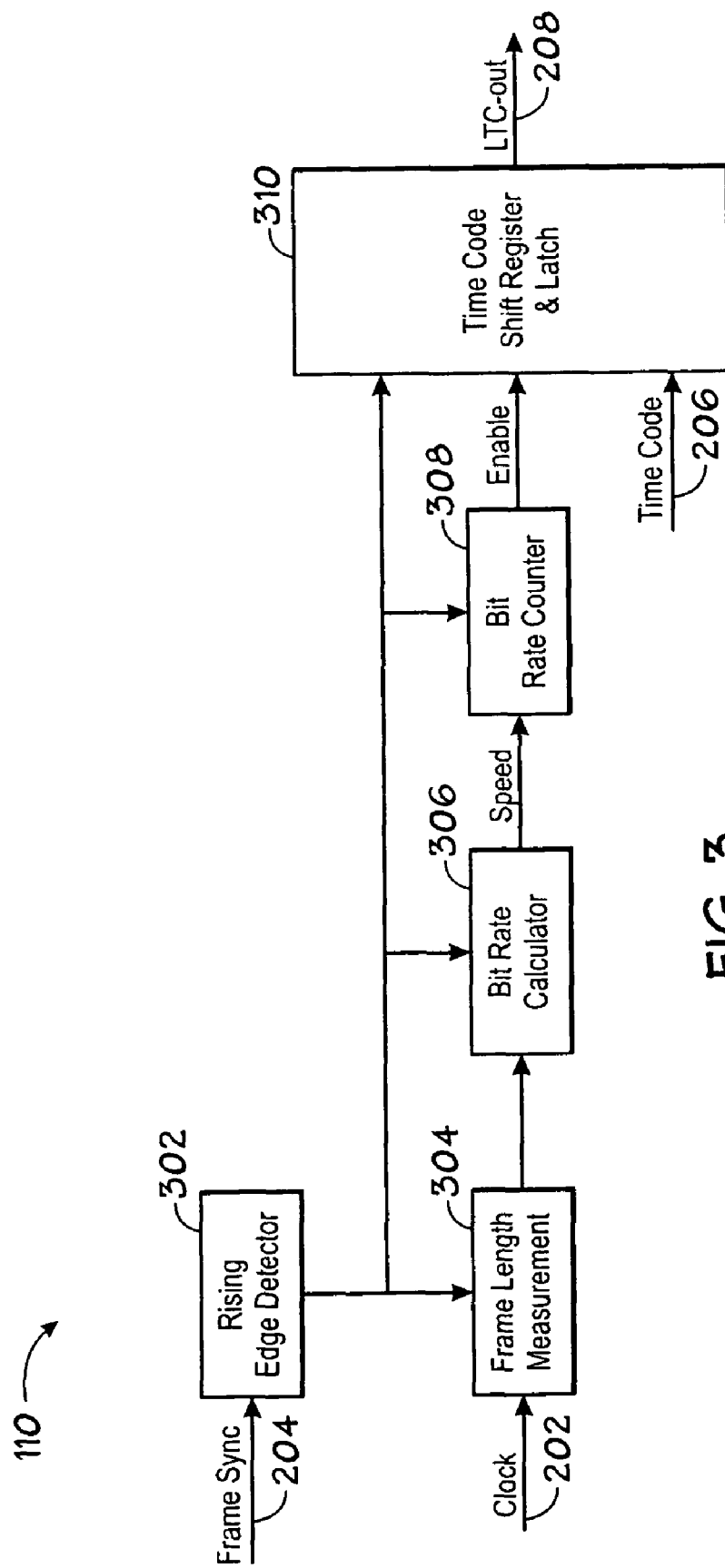
FIG. 3 is a functional block diagram of the linear time code generator shown in FIG. 2.

FIG. 3 is a functional block diagram of the linear time code generator shown in FIG. 2. The skilled person will appreciate that the various functional blocks shown in FIG. 3 may comprise hardware elements (including circuitry), software elements (including computer code stored on a machine-readable medium such as the memory 114) or a combination of both hardware and software elements. Preferably, the LTC generator 110 is implemented in programmable digital logic, such as with a field programmable gate array (FPGA).

A rising edge detector 302 receives the frame sync signal 204, which signifies the start of a new frame of video data. As shown in FIG. 3, the rising edge detector 302 delivers a signal corresponding to the start of a new frame of video data to other functional blocks of the LTC generator 110 to synchronize its operation.

The skilled person will appreciate that LTC data typically comprises 80 bits of data per video frame. These bits may be grouped as 64 bits of time code data and 16 bits that comprise a synchronization and direction sequence. A transition occurs at each bit cell boundary. If a logical one is represented, then an extra transition occurs at the middle of that bit cell.

Typical frame rates include 30 frames per second (fps), 29.97 fps, 25 fps, 24 fps and 23.98 fps. Preferably, the 80 bits of LTC data are evenly spaced over one frame time for frame rates below a predetermined threshold of, for example, 30 Hertz. If the frame rate is above a predetermined threshold of, for example, 30 Hertz (as would be the case for a 50 or 60 Hz high definition video signal), then the reference frame time may be spaced over two frames instead of one.

A frame length measurement block 304 measures the length of a frame in clock cycles of the applied clock signal 202. Next, a calculation is performed to determine the bit rate according to the following formula:

$$2 * BitRate = \frac{2^n * x}{Frame\_time\_in\_clock\_cycles}.$$

In an exemplary embodiment of the present invention that employs an 80-bit time code information word for each component of LTC data, the value of the variable x is 160, or twice the number of bits in each component of LTC data. Doubling of the number of time code information bits in the formula is required if the LTC data is bi-phase mark encoded. The skilled person will appreciate that the choice of a value for n represents a compromise between accuracy and performance (e.g., speed). Smaller values of n produce less accurate results but employ fewer resources. Larger values of n produce more accurate results at cost of additional system resources. An n value of 32 seems to be accurate enough to have a maximum deviation of +/−1 clock cycle for the last enable pulse, which is a desirable value. An n value of 24 has been tried, but this seems to have an inaccuracy of several clock cycles. However, the accuracy also depends upon the clock frequency, and thus the values for n may be different. Generally speaking, the lower the clock frequency, the fewer the value n may be chosen. A lower clock frequency also results in a lower resolution.

The division is preferably performed by a bit rate calculator block 306 as a long division where subtraction is done serially. The calculated bit rate is delivered to a bit rate counter 308, which produces enable pulses at $\frac{1}{160}$ of a frame time. These enable pulses together with a strobe pulse from the frame sync rising edge detector control an output shift register 310. The first bit of LTC data is presented at the rising edge pulse, which is generated by the rising edge detector 302 in response to the frame sync input 204. The remaining 159 shift pulses are supplied by the bit rate counter 308. The use of 160 total shift pulses allows automatic distribution of LTC data into either a video frame of standard definition video (80 bits of LTC data per frame) or a video frame of high definition video (80 bits of LTC data distributed over two frame times).

The LTC data output 208 is preferably stored in association with a corresponding frame of video data recorded by the camera system 100 (FIG. 1).

The skilled person will appreciate that, because the bit rate is calculated in an exemplary embodiment of the present invention, the application of LTC data is not dependent on the frame length (frame rate) of the clock frequency.

In a preferred embodiment of the invention, frame length measurement is done by a 24-bit counter. During the measurement, the counter should not overflow. Even with the longest frame time, 41.7 milliseconds (corresponding to 23.98 Hz), the maximum theoretical clock frequency should not exceed 400 MHz. Any clock frequency below this limit is permissible if permitted by design considerations of a particular embodiment (for example, limitations of a particular FPGA device. Lower frequencies only influence the output resolution. For example 10 MHz has a resolution of 100 nanoseconds.

The skilled person will appreciate that it takes a little more than one frame time for the LTC generator 110 to produce a correct speed value. In an exemplary embodiment, the LTC generator 110 produces the time code with correct timing after two frame times. The first frame time is used to measure the frame length and the beginning of the second frame time, the bit rate is calculated by the bit rate calculator block 306. The LTC-generator 110 preferably operates when the frame rate is constant. Accordingly, exemplary embodiments of the present invention are well-suited for use in digital video camera systems.

The skilled person will appreciate that combining any of the above-recited features of the present invention together may be desirable.

What is claimed, is:

1. A linear time code (LTC) generator that is adapted to generate LTC data, the LTC generator comprising:
    a detector that is adapted to detect a frame sync input corresponding to a beginning of a frame time of video data and to generate a first synchronization signal corresponding to the frame sync input;
    a frame length determination block that is adapted to determine a frame length of the video data in clock cycles by counting a number of clock cycles in the frame time;
    a bit rate counter block that is adapted to generate a second synchronization signal corresponding to a bit rate that is determined from the frame length in clock cycles; and
    an output device that is adapted to insert a first data bit of the LTC data into a digital bit stream according to the first synchronization signal and to insert subsequent data bits of the LTC data into the digital bit stream according to the second synchronization signal, so that the application of the LTC data is not dependent on the frame length, wherein said bit rate being determined according to the formula $$2 * BitRate = \frac{2^n * x}{Frame\_time\_in\_clock\_cycles}$$

where x is twice a length of a time code information word of the linear time code data and n is a number of time code information bits.

2. The linear time code generator according to claim 1, said output device being adapted to insert the LTC data across a single frame time if the frame of video data has a frame rate below a predetermined threshold.

3. The linear time code generator according to claim 1, said output device being adapted to insert the LTC data across two frame times if the frame of video data has a frame rate above a predetermined threshold.

4. The linear time code generator according to claim 1, said output device being adapted to store the LTC data in association with a corresponding frame of video data.

5. A method for applying linear time code (LTC) data to a digital bit stream, the method comprising the steps of:
    counting a number of clock cycles in a frame time of video data;
    determining a flame length of the video data in clock cycles by counting a number of clock cycles in the flame time;
    inserting a first data bit of the linear time code data into the digital bit stream according to a first synchronization signal that corresponds to a start of the flame time; and
    inserting subsequent data bits of the linear time code data into the digital bit stream according to a second synchronization signal that corresponds to a bit rate that is determined from the flame length in clock cycles, so that the application of the LTC data is not dependent on the flame length, wherein said bit rate being determined according to the formula $$2 * BitRate = \frac{2^n * x}{Frame\_time\_in\_clock\_cycles}$$

where x is twice a length of a time code information word of the linear time code data and n is a number of time code information bits.

6. The method for applying linear time code data to a digital bit stream according to claim 5, comprising the step of:
    inserting the LTC data across a single frame time if the frame of video data has a frame rate below a predetermined threshold.

7. The method for applying linear time code data to a digital bit stream according to claim 5, comprising the step of:
    inserting the LTC data across two frame times if the frame of video data has a frame rate above a predetermined threshold.

8. The method for applying linear time code data to a digital bit stream according to claim 5, further comprising the step of:
    storing the LTC data in association with a corresponding frame of video data.

* * * * *